Feb. 9, 1954     W. J. EBERLE ET AL     2,668,511
PLUMBER'S TOOL
Filed Dec. 17, 1951

William J. Eberle
Emile B. Dubuisson
INVENTORS

Patented Feb. 9, 1954

2,668,511

UNITED STATES PATENT OFFICE 2,668,511

PLUMBER'S TOOL

William J. Eberle and Emile B. Dubuisson, Elsa, Tex.; said Eberle assignor to I. B. Henson, Jr., Elsa, Tex.

Application December 17, 1951, Serial No. 261,962

3 Claims. (Cl. 113—103)

The present invention relates to new and useful improvements in plumber's tools for use particularly in wiping joints and has for one of its important objects to provide, in a manner as hereinafter set forth, a device of this character comprising novel means for gripping the pieces to be joined internally and holding them in true alignment as long as may be desired.

Another very important object of the invention is to provide a device of the aforementioned character which will automatically center itself in the work.

Still another important object of the invention is to provide a device of the character described which will automatically adjust itself to compensate for expansion or contraction as either may occur in the work.

Other objects of the invention are to provide a joint wiping device of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
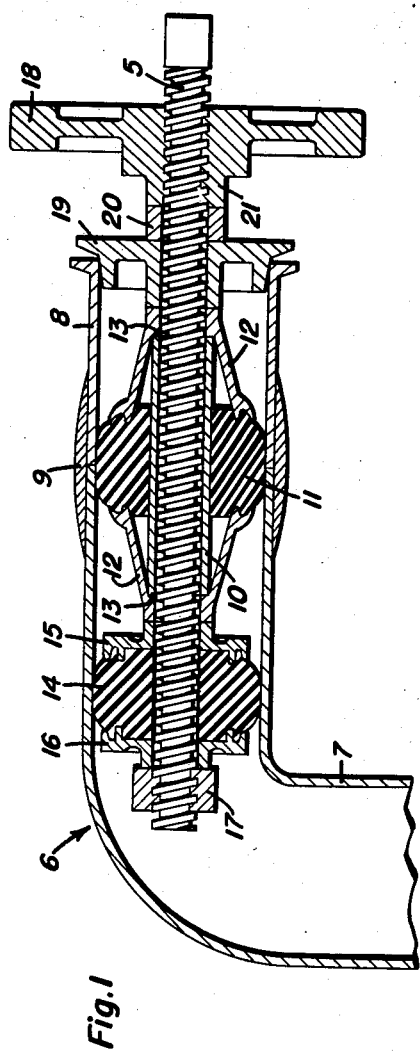
Figure 1 is a view in vertical longitudinal section, showing a device embodying the present invention in use.
Figure 3:
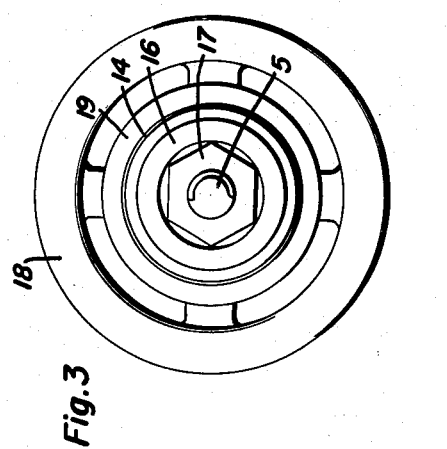
Figure 3 is an elevational view, looking at the other end of the device.
Figure 2:
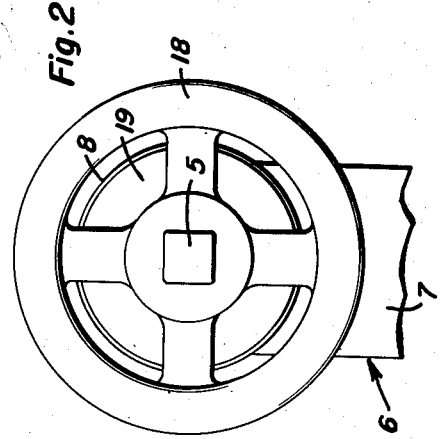
Figure 2 is an elevational view, looking at one end of the device.

Referring now to the drawing in detail, it will be seen that the embodiment of the invention which has been illustrated comprises a threaded mandrel or shaft 5 of suitable length and diameter. As illustrated to advantage in Figure 1 of the drawing, the shaft 5 is insertable longitudinally in the work, as at 6. The work 6 includes an elbow or bend 7 to which a thimble 8 is connected by a wiped joint 9.

Slidably mounted on an intermediate portion of the shaft 5 is a sleeve 10. Mounted at an intermediate point on the sleeve 10 is an expansible collar 11 of rubber or other suitable material. The expansible collar 11 is engageable with the adjacent end portions of the pieces 7 and 8 of the work 6 for aligning said pieces and for sealing the joint together against the leakage of solder to the interior thereof.

Oppositely disposed cones 12 are slidably mounted on the shaft 5 at the ends of the sleeve 10. The cones 12 encircle the end portions of the sleeve 10 and are engaged with the ends of the expansible collar 11. The small end portions of the cones 12 are formed to provide internal shoulders 13 for abutting engagement with the opposed ends of the sleeve 10.

Slidably mounted on the inner end portion of the shaft 5 is an expansible head 14 which is substantially similar to the collar 11 and which is also of rubber or other suitable material. The expansible head 14 is mounted between metallic disks or washers 15 and 16 on the shaft 5, the former being slidable on said shaft and engageable with the adjacent cone 12, the latter being threaded on the shaft. A lock nut 17 is threaded on the inner end portion of the shaft 5 for securing the washer 16 in position.

A handwheel 18 is threadedly mounted on the outer end portion of the shaft 5. Also mounted on the outer portion of the shaft 5 is a slidable, substantially conical closure or plug 19 which is adapted to seat in the outer end of the thimble 8. The conical plug 19 is engageable with the outer end of the adjacent cone 12. A spacer 20 is provided on the shaft 5 between the plug 19 and the hub portion 21 of the handwheel 18.

It is thought that the manner in which the device is used will be readily apparent from a consideration of the foregoing, particularly to those engaged in the plumbing industry. Briefly, the assembly is inserted in the work 6 and the collar 11 is positioned at the joint 9. With the conical closure or plug 19 seated in the thimble 8, the handwheel 18 is turned in a direction to pull the screw shaft 5 outwardly. In this manner the collar 11 is compressed longitudinally and expanded radially by the cones 12 for aligning and sealing the joint and the head 14 is expanded in a similar manner between the elements 15 and 16 into engagement with the inner periphery of the bend 7. The sleeve 10, engaging the shoulders 13, positively limits the movement of the cones 12 toward each other and consequently the expansion of the collar 11.

It is believed that the many advantages of a tool constructed in accordance with the present invention will be readily understood and although a preferred embodiment of the device is as illustrated and described, it is to be understood that changes in the details of the construction may be resorted to which will fall within the scope of the invention as claimed.

Having described the invention, what is claimed as new is:

1. A plumber's tool of the character described comprising a threaded shaft, a sleeve slidably mounted on said shaft, a resilient expansible collar mounted on said sleeve, a pair of cones slidably mounted on the shaft adjacent the ends of the sleeve and engaged with the collar, stop means for said cones mounted on one end of said shaft, means including a handwheel threadedly mounted on the other end of the shaft for moving the cones toward each other for expanding the collar, said sleeve being engageable with the cones for positively limiting the movement thereof toward each other.

2. A joint wiping tool of the character described comprising a threaded shaft insertable in the work, a closure engageable in the work and slidable on the shaft, a resilient expansible head on the inner end portion of the shaft, a resilient expansible joint sealing collar on the shaft between the head and closure, means including a handwheel threadedly mounted on the shaft for shifting same longitudinally through the closure, a nut on the inner end portion of the shaft forming a stop for the head, cones mounted on the shaft between the head and the closure and engaging opposite sides of the collar for expanding the head and the collar into engagement with the work when the shaft is actuated by the handwheel.

3. A joint wiping tool of the character described comprising a threaded shaft insertable in the work, a resilient expansible collar on the inner portion of the shaft engageable with the work, a closure on the outer portion of the shaft engageable in the work for supporting said shaft therein, a sleeve loosely mounted on the shaft between the head and the closure, a pair of cones loosely mounted on the shaft and engaged with the ends of the collar, a stop member on the inner end of said shaft, a clamping member threadedly engaged on the outer end portion of said shaft for drawing said shaft through said closure to move said cones toward each other for longitudinally compressing and radially expanding the collar, and internal shoulders in the cones engageable with the ends of the sleeve for limiting the movement of said cones toward each other.

WILLIAM J. EBERLE.
EMILE B. DUBUISSON.

References Cited in the file of this patent
UNITED STATES PATENTS

| Number | Name | Date |
|---|---|---|
| 640,524 | Bartels | Jan. 2, 1900 |
| 914,743 | McDonald | Mar. 9, 1909 |
| 2,460,325 | Whitson | Feb. 1, 1949 |
| 2,559,210 | Bradley | July 3, 1951 |